United States Patent
Ekwall et al.

(10) Patent No.: US 9,116,917 B1
(45) Date of Patent: Aug. 25, 2015

(54) AUGMENTING A GEOGRAPHIC INFORMATION SYSTEM

(75) Inventors: Richard Ekwall, Stäfa (CH); Lara Coelho, Belo Horizonte (BR)

(73) Assignee: GOOGLE INC., Mountain View, CA (US)

( * ) Notice: Subject to any disclaimer, the term of this patent is extended or adjusted under 35 U.S.C. 154(b) by 378 days.

(21) Appl. No.: 13/604,401

(22) Filed: Sep. 5, 2012

(51) Int. Cl.
*G06F 17/30* (2006.01)

(52) U.S. Cl.
CPC .................. *G06F 17/30241* (2013.01)

(58) Field of Classification Search
None
See application file for complete search history.

(56) References Cited

U.S. PATENT DOCUMENTS

| | | |
|---|---|---|
| 2003/0061211 A1* | 3/2003 | Shultz et al. ............ 707/3 |
| 2006/0002189 A1* | 1/2006 | Berkman .............. 365/185.2 |
| 2007/0118430 A1 | 5/2007 | Wiseman et al. |
| 2007/0198495 A1 | 8/2007 | Buron et al. |
| 2008/0243824 A1 | 10/2008 | Riise et al. |
| 2009/0265388 A1 | 10/2009 | Xiao et al. |
| 2010/0281011 A1 | 11/2010 | Santi et al. |
| 2012/0078754 A1 | 3/2012 | Wiseman et al. |
| 2012/0233140 A1* | 9/2012 | Collins-Thompson et al. ............ 707/706 |
| 2013/0073393 A1* | 3/2013 | Nasr ................ 705/14.58 |

OTHER PUBLICATIONS

Alpha shape From Wikipedia, the free encyclopedia; en.wikipedia.org/wiki/Alpha_shape; pp. 1-2.
Tokenization From Wikipedia, the free encyclopedia; en.wikipedia.org/wiki/Tokenization; p. 1.
Convex hull algorithms From Wikipedia, the free encyclopedia; en.wikipedia.org/wiki/Convex_hull_algorithms; pp. 1-5.

* cited by examiner

*Primary Examiner* — Bai D. Vu
(74) *Attorney, Agent, or Firm* — Marshall, Gerstein & Borun LLP (57) ABSTRACT

Provided is a process for augmenting a geographic information system. Some examples of the process include comparing, with a computer system, street addresses to a geographic information system to identify addresses having a term that is not recognized by the geographic information system; removing, with the computer system, the term from the identified addresses to form redacted addresses; retrieving, with the computer system, a plurality of geolocations corresponding to the redacted addresses from the index; determining, with the computer system, a bounding area of the plurality of geolocations; and augmenting, with the computer system, the geographic information system with an entry associating the bounding area with the term.

19 Claims, 5 Drawing Sheets

AUGMENTING A GEOGRAPHIC INFORMATION SYSTEM

BACKGROUND OF THE INVENTION

1. Field of the Invention

The present invention relates generally to geographic information systems and, more specifically, to updating geographic information systems to include missing information.

2. Description of the Related Art

Information in a geographic information system (GIS) associates geographic locations, or geolocations, with the names of geographically-distributed features (i.e., points of interest)—such as businesses, cities, roads, neighborhoods, states, and the like—found at those geolocations. Thus, given the name of a feature, the GIS can return the geographic location of that feature. These systems are often used by search engines to respond to queries that implicate a geographic location and by advertisement servers for selecting advertisements appropriate for a geographic location, e.g., for targeting local advertisements. Consequently, it is desirable for the information in the GIS to be relatively comprehensive and for the GIS to promptly return search results.

SUMMARY OF CERTAIN ASPECTS OF THE INVENTION

The following is a non-exhaustive listing of some aspects of the present techniques. These and other aspects are described in the following disclosure.

In some aspects, the present invention includes a process for augmenting a GIS. Some examples of the process include comparing, with a computer system, street addresses to a GIS to identify addresses having a term that is not recognized by the GIS; removing, with the computer system, the term from the identified addresses to form redacted addresses; retrieving, with the computer system, a plurality of geolocations corresponding to the redacted addresses from the index; determining, with the computer system, a bounding area of the plurality of geolocations; and augmenting, with the computer system, the GIS with an entry associating the bounding area with the term.

Some aspects include a system for augmenting a GIS in accordance with the above-mentioned aspects.

Some aspects include a tangible, machine-readable, non-transitory medium storing instructions that when executed by a computing system cause the computing system to perform the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

Figure 1:
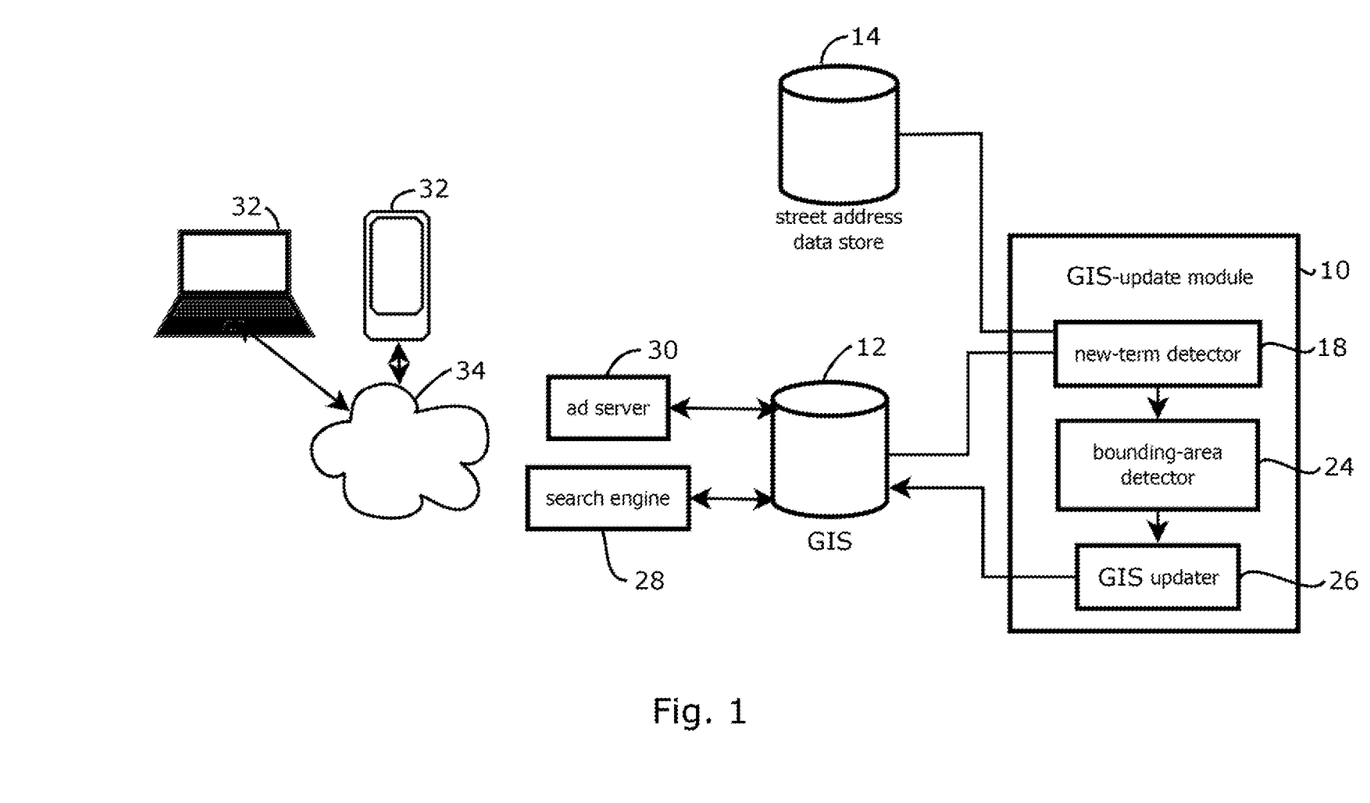
FIG. 1 shows a GIS-update module in accordance with some embodiments and the environment in which the GIS-update module operates.

FIG. 1 illustrates an embodiment of a GIS-update module 10 that is operative to discover and add new entries to a GIS 12. Potential new entries are identified based on a collection of street addresses stored in a street address data store 14. The update module 10 attempts to geocode each street address in the data store 14 using the GIS 12. If a street address cannot be geocoded, one or more terms can be redacted from the address until a modified address is obtained that can be geocoded using the GIS 12. The one or more redacted terms are then stored with the geocodes returned by the GIS for the modified addresses that were formed by removing the redacted terms. For each redacted term, a point cloud of geographic locations (i.e., geocodes) that is indicative of the geographic area corresponding to the redacted term is thereby obtained. The redacted terms and their corresponding areas are then added to the GIS 12 as new features, thereby increasing the comprehensiveness of the GIS 12 and facilitating faster searches for queries that include the formerly unrecognized term.

For example, the three addresses "25 First Street Lapa Rio de Janeiro," "34 Second Street Lapa Rio de Janeiro," and "27 Third Street Lapa Rio de Janeiro," may fail to geocode when searched against the GIS 12. These addresses, however, may geocode to the geographic points—e.g., latitude and longitude coordinates—P1, P2, and P3, respectively, when the word "Lapa" is redacted from each address. These points define a point cloud {P1, P2, P3} corresponding to the word "Lapa." And the point cloud defines a triangle, in this example, that likely corresponds to the geographic area defined by the term "Lapa." The term and corresponding area are added to the GIS 12, improving speed and quality of future searches.

In some embodiments, the GIS-update module 10 includes a new-term detector 18, a bounding-area detector 24, and an GIS updater 26. These components exchange information with one another, the street address data store 14, and the GIS 12, in order to identify new features, determine the features' corresponding areas, and augment the GIS 12.

The components 18, 24, and 26 are illustrated as discrete blocks, which may correspond to separate bodies of code providing the functionality of these components and executing on the same or separate computing devices or collection of computing devices, but it should be noted that the code by which this functionality is provided may be organized differently from what is illustrated, for example the code may be conjoined, subdivided, or intermingled. The GIS-update module 10 may be implemented as one or more processes executing on one or more processors in communication with a tangible, non-transitory, machine-readable memory storing instructions that when executed by the processors cause the GIS-update module 10 to provide the functionality described herein. Some embodiments of the GIS-update module 10 are configured to perform processes described below with reference to FIGS. 2-4 for updating the geographic location index 12. Accordingly, the functionality of components 18, 24, and 26 is described below with reference to these figures.

The GIS 12 is operative to return geolocations in response to a query. To this end, the GIS includes a database that associates feature names (i.e., names by which the feature is known to users, as occurs in a user query) with geolocations. The database also stores information about hierarchical relationships, indicating which features are found within the geolocation of larger features, such as cities within states, zip codes within cities, addresses on streets, and neighborhoods within zip codes or across zip codes. Depending on the type of feature, geolocations can be areas or points identified with reference to their place on earth. Terms in feature names may also be indexed and organized to facilitate relatively prompt responses to queries. The GIS 12 may include servers that accept queries, retrieve locations, and respond to the queries, indicating whether a given query geocodes to a geographic area, and if so, the geolocation(s) responsive to the query.

The street address data store 14 includes a plurality of street addresses. The addresses can be obtained from a variety of sources, including a query log of a search engine, scraping addresses from websites, or by purchasing or manually accumulating lists of business addresses. In some use cases, each of the addresses is consistent with a street-address pattern, for example including a numerical component of the street address preceding the street name, a street name, a city name, a zip code, a state name, or a subset thereof.

The GIS 12 communicates with a search engine 28 and an ad server 30 that serve user devices 32 over the Internet 34. The search engine 28 receives queries from user devices 32, for example text entered into a input field on a webpage of the search engine 28, and the search engine 28 responds with one or more resources—e.g., documents, webpage links, or other data—responsive to the query. The search engine 28 may be a feature of an interactive online map. Queries may be accompanied with data indicative of a geographic location, either in the text of the query itself, or from an extent of a map viewed by a user in an interactive map, or from a geolocation sensor on the user devices 32, provided that the user elects to share this information. The geolocation-related data associated with the query is then used to search the GIS 12 to determine or rank query results, which are returned to the user device 32 over the Internet 34. Similarly, the ad server 30 serves advertisements for display on webpages viewed on user devices 32, and the advertisers are selected based on a geographic location and the data in the GIS 12.

Both serving ads and responding to search queries are often time-sensitive, and a portion of the time taken to respond is consumed by the GIS 12. If the query relates to a feature that is not in the GIS 12, the GIS 12 takes longer to respond, as the search may consume two or more search iterations to identify which terms of the query are not in the GIS and to resubmit the query with potentially unrecognized terms removed. Accordingly, updating the GIS 12 to reduce the number of unrecognized terms is expected to expedite responses to search engine queries and request for advertisements. Another benefit provided by some embodiments is that a more comprehensive GIS offers higher quality search results. Augmenting the GIS 12 with information about more features increases the likelihood that any given feature submitted in, or relevant to, a query will be properly geolocated.

Figure 2:
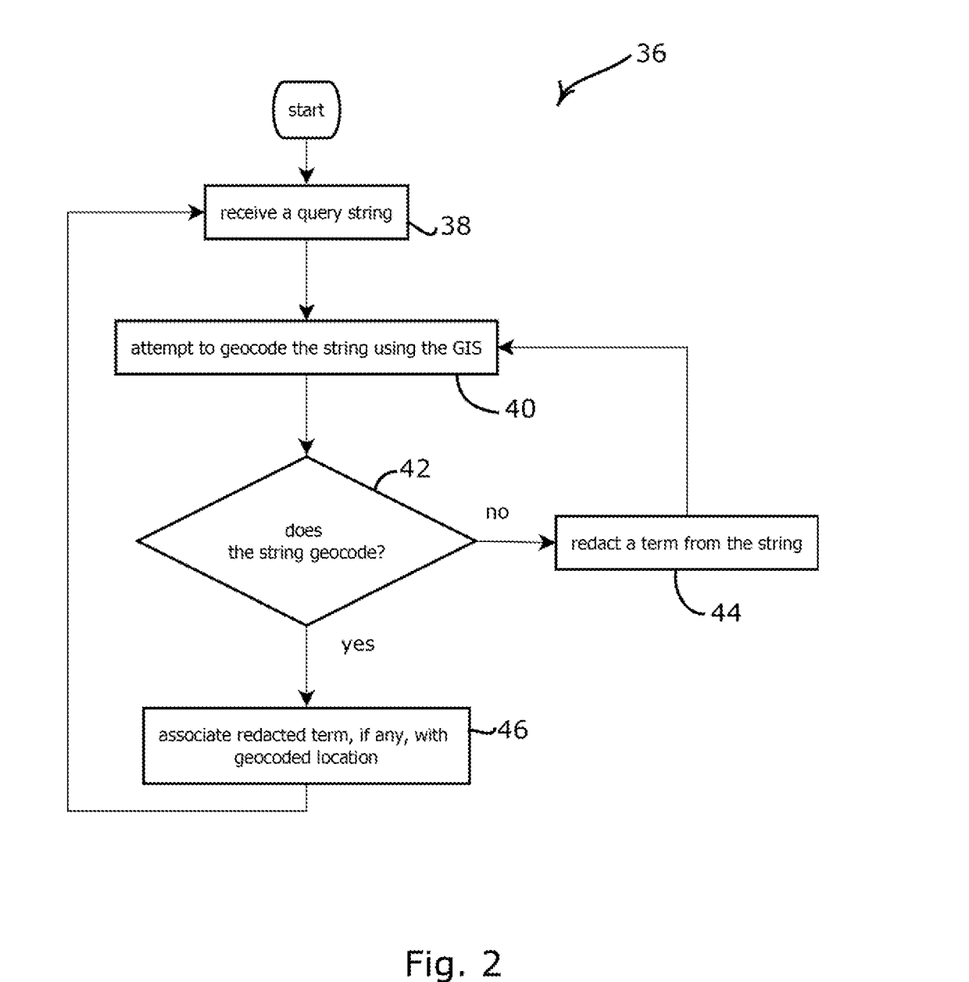
FIG. 2 shows a process for searching a GIS in accordance with some embodiments.

FIG. 2 depicts a process 36 for searching the GIS 12 and identifying missing terms and corresponding geolocations. The process 36 is performed by the GIS-update module 10 and the GIS 12 of FIG. 1. To this end, the process 36 may be stored as code on a tangible, non-transitory, machine-readable medium, or the process 36 may be executed by one or more processors coupled to memory storing instructions for executing the process 36, such as part of a specially programmed computing system embodying the GIS-update module 10 of FIG. 1. The process 36 may be executed periodically, such as nightly or weekly, or in response to the accumulation of a threshold number of addresses in the street address data store 14 or a threshold amount (e.g., number or frequency) of failed queries for one or more terms in the GIS 12.

The process 36 includes receiving a query string, as indicated by block 38. The query string is an address from the street address data store 14 retrieved by the new-term detector 18 iterating through the stored street addresses. The new-term detector 18 submits the address to the GIS 12 to attempt to geocode the full string, as indicated by block 40. The GIS 12 responds with either a geocoded location corresponding the query or with a signal indicating that the query failed to geocode.

If the query string did not geocode, in response, the new-term detector 18 redacts a term from the previously submitted string and resubmits the redacted query to the GIS 12, as indicated by blocks 42 and 44 of FIG. 2. Terms for redaction are defined by the presence of whitespace characters, as generally marks the beginning and end of a word. These steps of redacting a term 44 and submitting the modified query 40 proceeds, redacting a different term in the query and replacing the previously redacted term, until the GIS 12 responds with a geocoded location. If all of the terms have been redacted without a modified query geocoding, the steps 40, 42, and 44 are repeated by redacting two consecutive terms, and re-submitting the modified query, iterating through the query string in a similar fashion, until the address geocodes, or a query has been attempted with each pair of adjacent terms redacted. The process 36 may continue by redacting three or more consecutive terms, until the modified query geocodes, or the number of terms redacted approaches the length of the original query string.

Once a query string successfully geocodes, the redacted term (or terms, if consecutive terms, when redacted, cause a successful query), if any, that caused the address to geocode is associated with the geocoded location in memory, as indicated by blocks 42 and 46. Query strings that geocode on the first attempt, unmodified, do produce a record in this step, but terms that, when redacted, resulted in a previously failing geocoding attempt succeeding, are stored. The stored terms are used to determine the geographic area corresponding to the term based on the associated geolocations identified by the ultimately successful queries to the GIS 12. The process 36 is repeated for a plurality of addresses in the street address data store 14, potentially yielding a plurality of terms missing from the GIS and for each of those terms, a plurality of corresponding geolocations identified by querying the GIS with that term redacted from a street address.

Alternatively, or additionally, missing terms in the GIS 12 may be identified with other techniques. For example, query logs may be examined to identify terms removed by users between successive queries, in an attempt to improve relevancy of their search results. Such search-behavior potentially indicates that the removed term is a potentially unrecorded, or mis-recorded feature, and the present process may be used to geolocate the term or correct a flawed geolocation. Further, the GIS 12 itself may include indicators of missing or inaccurate features. For example, features having entries without relationships to other features may have absent or inaccurate geolocation data upon which the present process can improve.

Figure 3:
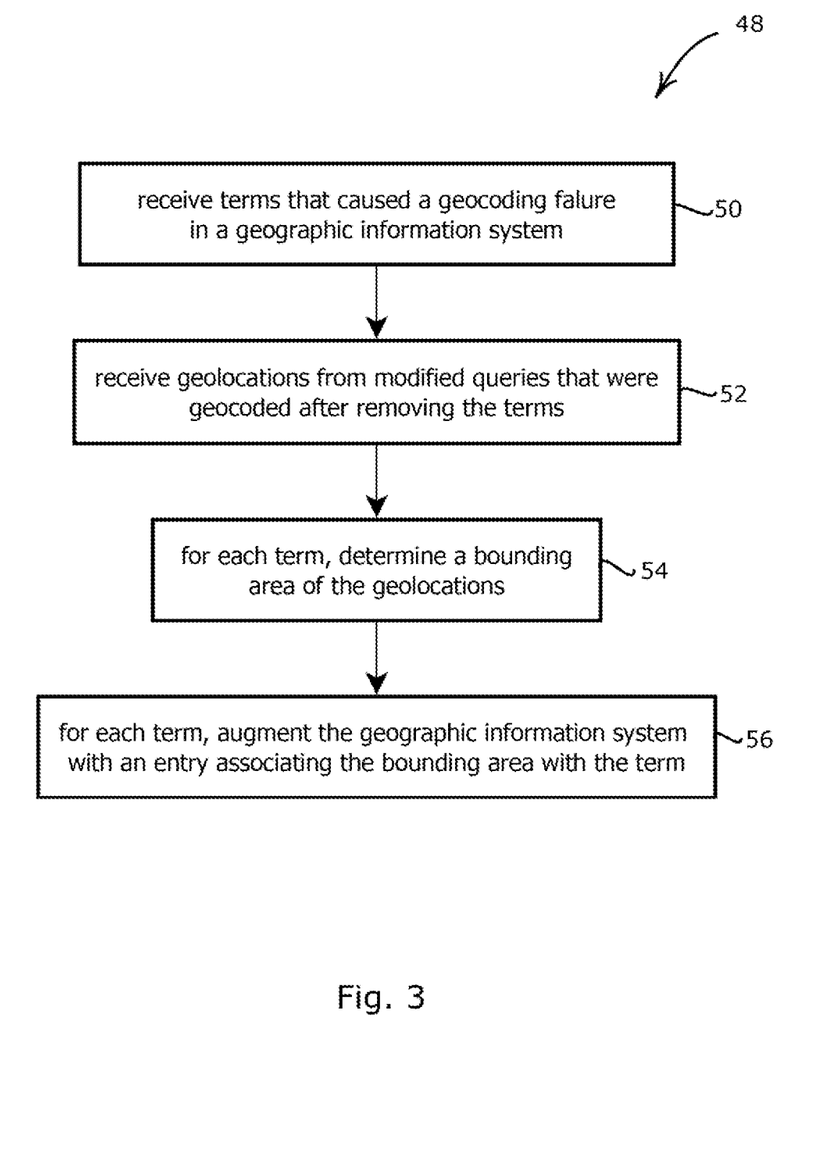
FIG. 3 shows an example of a process by which a GIS is updated in accordance with some embodiments.

FIG. 3 depicts an embodiment of a process 48 for determining the geographic area corresponding to each term identified in the process of FIG. 2. The process 48 may be performed by the bounding-area detector 24 and the GIS updater 26 of FIG. 1. To this end, the process 48 may be stored as code on a tangible, non-transitory, machine-readable medium, or the process 48 may be executed by one or more processors coupled to memory storing instructions for executing the process 48, such as part of a specially programmed computing system embodying the GIS-update module 10 of FIG. 1.

The process 48 includes receiving terms that caused a geocoding failure in the GIS 12, as indicated by block 50, and receiving geolocations from modified queries that were geocoded after removing the terms, as indicated by block 52. Receipt of this data may be effectuated by executing the process of FIG. 2. In some embodiments, the new-term detector 18 determines whether the number of addresses having the unrecognized term exceeds a threshold and only advances to the bounding-area detector 24 those terms having greater than the threshold number of addresses, limiting which terms undergo the process 48. Filtering sparsely occurring terms is expected to increase the likelihood that the addresses are representative of a geographic area.

For each received term, a bounding area of the corresponding geolocations is determined, as indicated by block 54. The geolocations, in some embodiments, describe a point cloud on a two-dimensional surface—e.g., on the surface of the earth—which can be characterized by a corresponding area. For example, the area may encompass every responsive geolocation. Various techniques may be used to determine the bounding area based on the geolocations.

Figure 4:
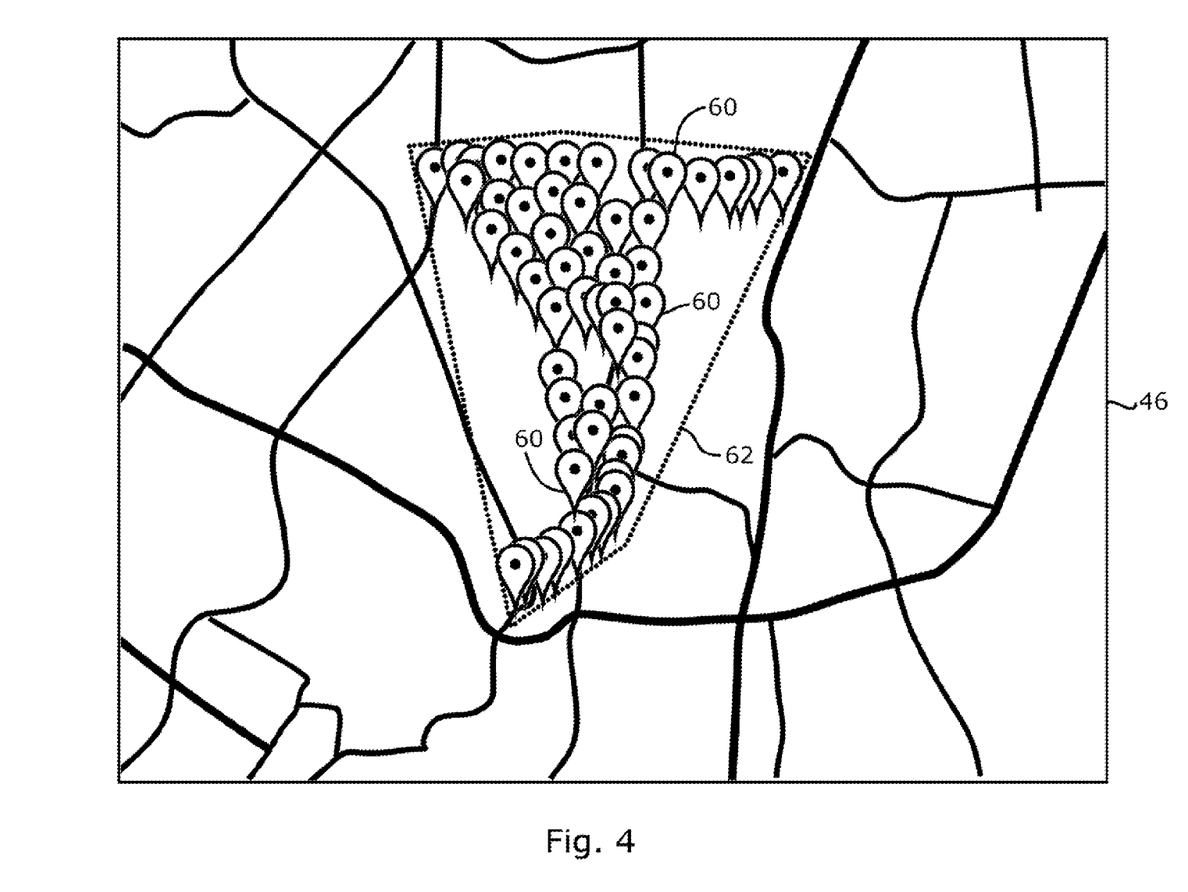
FIG. 4 shows an example of data indicative of a new entry to be added to a GIS.

In some embodiments, as shown in FIG. 4, the bounding-area detector 24 determines a convex hull that encompasses all of the geolocations. FIG. 4 illustrates a map 58 with a plurality of geolocations 60 represented as marker pins. Each of the geolocations 60 corresponds to a redacted address determined as described above, and all represented addresses had the same term removed before the first successfully geocoded submission to the GIS 12. The bounding area 62 is a single polygon determined based on these geolocations 60 using a convex hull algorithm. The number of vertices of the convex hull is selected based on the positions of the identified geolocations. The vertices are positioned and numbered such that each of the geolocations is either contained by a convex polygon defined by the vertices or is at a vertex itself. In some embodiments, end-users are not shown the bounding area, and a rough approximation is adequate for providing relatively accurate searches. In some cases, the number of vertices may be forced to be relatively low, such as between three and eight, to simplify the calculation of an approximate convex hull.

In another example, the region of the map 58 is quantized into unit cells, such as squares in regular rectangular grid, and the bounding area is defined as the union of unit cells of the grid that include at least one responsive geolocation. Consequently, the bounding area of some embodiments can encompass multiple noncontiguous areas. In some cases, the plurality of areas are filtered to remove noncontiguous areas having less than a threshold number of responsive geolocations. Other embodiments use other techniques for determining the bounding area, for example the bounding area may be defined by an alpha shape corresponding to the geolocations.

Some terms are potentially not unique to a given city, and a bounding area spanning between cities is likely unrepresentative of the referent of that term. For example, the term "downtown" is used in reference to both downtown Chicago and downtown New York, but a bounding area spanning between the cities would encompass areas that do not correspond to the term "downtown." To account for multi-city terms, some embodiments determine the bounding area on a city-by-city basis. The city corresponding to each of the redacted addresses (i.e., the city of the address) is retrieved from the GIS 12 using the above-mentioned hierarchical relationships between the entries in the GIS 12 by the bounding-area detector 24. The bounding-area detector 24 then groups the geolocations by city and determines for each city a bounding area. In some embodiments, bounding areas are only determined for cities in which more than a threshold number of geolocations are identified in that city.

Finally in this embodiment of process 48, the GIS is augmented with an entry associating the bounding area with the unrecognized term, as illustrated by block 56 of FIG. 3. To this end, the bounding-area detector 24 of FIG. 1 communicates the determined bounding area and the corresponding term to the GIS updater 26, which loads the bounding area and the term in the GIS 12 in an entry associating the two fields (e.g., with a one-to-one association). The GIS 12 or GIS updater 26 may further update hierarchical relationships indicated by the updated data, e.g., noting that a neighborhood corresponding to a term is within a given city and includes certain businesses, and indexes for searching the GIS 12 may be updated to include entries for the added term.

Augmenting the GIS 12 with the new term is expected to facilitate faster geolocation-related searches. Terms likely to appear in a search query will be correlated with a geolocation by the GIS 12 in advance of the search. Further, updating the GIS 12 without manually researching referents of new terms is expected to be less expensive than placing this burden on human operators tasked with keeping the GIS 12 current. And certain embodiments are expected to improve the quality of responses to queries, as making the GIS more comprehensive increases the number of areas that can be properly geolocated.

Figure 5:
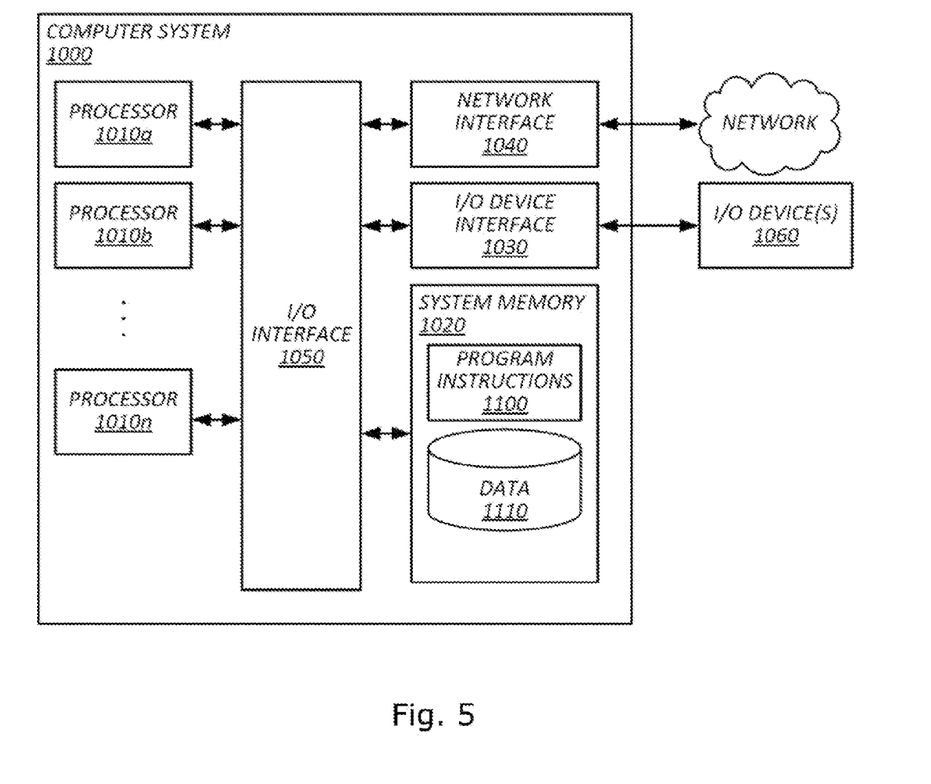
FIG. 5 shows an example of a computer system that, when properly programmed, cooperates with other such computer systems to provide the functionality described herein.

FIG. 5 illustrates an exemplary computing system 1000. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030 and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area (WAN), a cellular communications network or the like.

System memory 1020 may be configured to store program instructions 1100 or data 1110. Program instructions 1100 may be executable by a processor (e.g., one or more of processors $1010a$-$1010n$) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include, non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium may have program instructions stored thereon that are executable by a computer processor (e.g., one or more of processors $1010a$-$1010n$) to cause the subject matter and the functional operations described herein. A memory (e.g., system memory 1020) may include a single memory device and/or a plurality of memory devices (e.g., distributed memory devices). In some embodiments, the program may be conveyed by a propagated signal, such as a carrier wave or digital signal conveying a stream of packets.

I/O interface 1050 may be configured to coordinate I/O traffic between processors $1010a$-$1010n$, system memory 1020, network interface 1040, I/O devices 1060 and/or other peripheral devices. I/O interface 1050 may perform protocol, timing or other data transformations to convert data signals from one component (e.g., system memory 1020) into a format suitable for use by another component (e.g., processors $1010a$-$1010n$). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000, or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending or storing instructions or data implemented in accordance with the foregoing description upon a computer-accessible medium. Accordingly, the present invention may be practiced with other computer system configurations.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a", "an" and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Further, unless otherwise indicated, statements that one value or action is "based on" another condition or value encompass both instances in which the condition or value is the sole factor and instances in which the condition or value is one factor among a plurality of factors. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing or computing device is capable of manipulating or transforming signals, for instance signals represented as physical electronic, optical, or magnetic quantities within memories, registers, or other information storage devices, transmission devices, or display devices of the special purpose computer or similar special purpose processing or computing device.

What is claimed is:

1. A method of augmenting a geographic information system, the method comprising:
   comparing, by one or more processors, street addresses to a geographic information system to identify addresses having a term that is not recognized by the geographic information system, including for at least some of the street addresses:
      segmenting the street address into constituent terms,
      for at least one of the segmented terms, determining that the term is not a feature name in the geographic information system, and
      identifying the street address as having a term that is not recognized by the geographic information system;
   removing, by the one or more processors, the term from the identified addresses to form redacted addresses;
   retrieving, by the one or more processors, a plurality of geolocations corresponding to the redacted addresses from the geographic information system;
   determining, by the one or more processors, a bounding area of the plurality of geolocations; and
   augmenting, by the one or more processors, the geographic information system with an entry associating the bounding area with the term.

2. The method of claim 1, wherein comparing street addresses to the geographic information system comprises querying the geographic information system with each street address to determine whether the geographic information system geocodes the street address.

3. The method of claim 1, wherein comparing street addresses to the geographic information system to identify addresses having a term that is not recognized by the geographic information system comprises:
   identifying only those addresses having a non-recognized term that appears in more than a threshold amount of addresses.

4. The method of claim 1, wherein retrieving the plurality of geolocations corresponding to the redacted addresses from the index comprises:
   retrieving, for each of the redacted addresses, a geolocation point expressed as a latitude and longitude.

5. The method of claim 1, wherein determining the bounding area of the plurality of geolocations comprises:
   retrieving, from the geographic information system, an identifier of a city containing each of the geolocations;
   grouping the geolocations by city, the geolocations each being contained by one of a plurality of cities; and
   determining a plurality of bounding areas, each bounding area being defined by the geolocations in one of the cities.

6. The method of claim 5, wherein determining a plurality of bounding areas comprises determining that each of the bounding areas is defined by more than a threshold amount of geolocations.

7. The method of claim 1, wherein determining the bounding area of the plurality of geolocations comprises:
- determining the boundary area according to a union of unit geographic areas including the geolocations, the unit geographic areas defining a level of resolution of specifying a geographic area in the geographic information system.

8. The method of claim 1, wherein determining the bounding area of the plurality of geolocations comprises:
- determining the boundary area according to the perimeter of a convex hull containing the geolocations.

9. The method of claim 8, wherein the convex hull contains all of the geolocations.

10. The method of claim 8, wherein the convex hull is a convex polygon having vertices selected such that each geolocation is contained by the polygon.

11. The method of claim 1, wherein determining the bounding area of the plurality of geolocations comprises:
- determining the boundary area according to an alpha shape defined, at least in part, by the geolocations.

12. The method of claim 1, wherein determining the bounding area of the plurality of geolocations comprises:
- discarding an outlier among the plurality of geolocations.

13. The method of claim 1, wherein augmenting the geographic information system with an entry associating the bounding area with the term comprises:
- determining a hierarchical relationship to other features in the geographic information system, including designating the term as relating to a feature within a city in the geographic information system.

14. The method of claim 1, wherein the term is a name for a neighborhood, the street address includes a street address number and street name, and the retrieved geolocations include a point cloud of geolocations corresponding to the street addresses.

15. The method of claim 1, further comprising:
- obtaining the street addresses from a data store of business addresses, a data store of logged queries, or both.

16. The method of claim 1, further comprising:
- determining that a query includes the term;
- retrieving the bounding area from the augmented index based on the term; and
- providing search results responsive to the query based on the bounding area.

17. The method of claim 1, further comprising:
- determining that a query includes the term;
- retrieving the bounding area from the augmented index based on the term; and
- selecting an advertisement to display based on the bounding area.

18. A tangible, machine-readable, non-transitory medium storing instructions that when executed by one or more processors in a computing system cause the computing system to perform steps comprising:
- comparing addresses to a geographic information system to identify addresses having a term that is not recognized by the geographic information system, including for at least some of the addresses:
  - segmenting the address into constituent terms,
  - for at least one of the segmented terms, determining that the term is not a feature name in the geographic information system, and
  - identifying the address as having a term that is not recognized by the geographic information system;
- removing the term from the identified addresses to form redacted addresses;
- retrieving a plurality of geolocations corresponding to the redacted addresses from the geographic information system;
- determining a bounding area of the plurality of geolocations; and
- augmenting the geographic information system with an entry associating the bounding area with the term.

19. A system for augmenting a geographic information system, the system comprising:
- one or more processors;
- memory in communication with the processors and storing instructions that when executed by the processors cause the processors to perform steps comprising:
  - comparing addresses to a geographic information system to identify addresses having a term that is not recognized by the geographic information system, including for at least some of the addresses:
    - segmenting the address into constituent terms,
    - for at least one of the segmented terms, determining that the term is not a feature name in the geographic information system, and
    - identifying the address as having a term that is not recognized by the geographic information system;
  - removing the term from the identified addresses to form redacted addresses;
  - retrieving a plurality of geolocations corresponding to the redacted addresses from the geographic information system;
  - determining a bounding area of the plurality of geolocations; and
  - augmenting the geographic information system with an entry associating the bounding area with the term.

* * * * *